United States Patent [19]
Luoni

[11] Patent Number: 5,637,184
[45] Date of Patent: Jun. 10, 1997

[54] IMPROVED-EFFICIENCY WELDING DEVICE IN A PLASTIC BAG PRODUCTION MACHINE

[75] Inventor: Carlo Luoni, Busto Arsizio, Italy

[73] Assignee: ELBA S.p.A., Milan, Italy

[21] Appl. No.: 447,817

[22] Filed: May 23, 1995

[30] Foreign Application Priority Data

Jun. 8, 1994 [IT] Italy .................. MI94A01194

[51] Int. Cl.$^6$ .................................... B30B 5/00
[52] U.S. Cl. ................ 156/580; 156/583.1; 100/269.06; 100/291
[58] Field of Search ............... 156/580, 580.1, 156/581, 583.1; 100/93 P, 263, 269.06, 269.11, 280, 281, 282, 291

[56] References Cited

U.S. PATENT DOCUMENTS

| | | | |
|---|---|---|---|
| 4,245,516 | 1/1981 | Day | 100/282 X |
| 4,276,823 | 7/1981 | Rotzler | 100/282 X |
| 5,015,223 | 5/1991 | Boeckmann | 493/194 |
| 5,335,532 | 8/1994 | Mueller et al. | 72/450 |
| 5,481,898 | 1/1996 | Bakermans | 72/450 |

*Primary Examiner*—James Sells
*Attorney, Agent, or Firm*—Cushman Darby & Cushman IP Group of Pillsbury Madison & Sutro LLP

[57] ABSTRACT

An improved-efficiency welding device in a plastic bag production machine, of the type including an upper welding bar and a lower welding bar, at least one of which is driven with reciprocating vertical movement between a position separated from The plastics material to be welded and a position in contact with the plastics material and the lower or upper other bar, the movement of the at least one welding bar being imparted by a pair of vertically guided rods driven by a first eccentric linkage to which they are connected by a pin, the first linkage obtaining its movement from a central shaft, there being provided a second eccentric between the rod and the first eccentric linkage and driven by an additional motion transmission system which rotates it to cause the at least one welding bar to undergo a further lowering and/or raising movement at a predetermined stage, with resultant welding engagement between the an least one welding bar and the other welding bar.

5 Claims, 4 Drawing Sheets

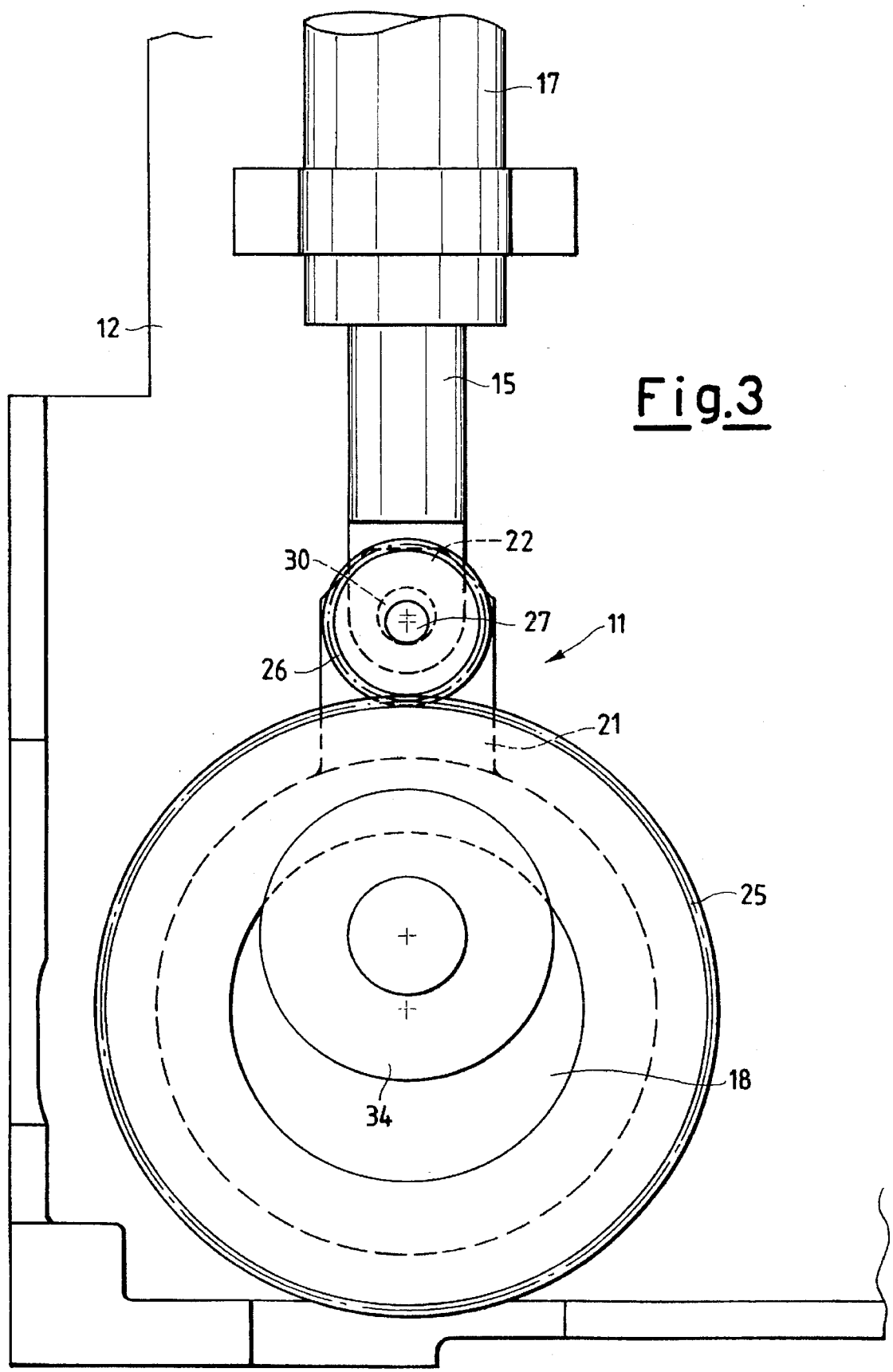

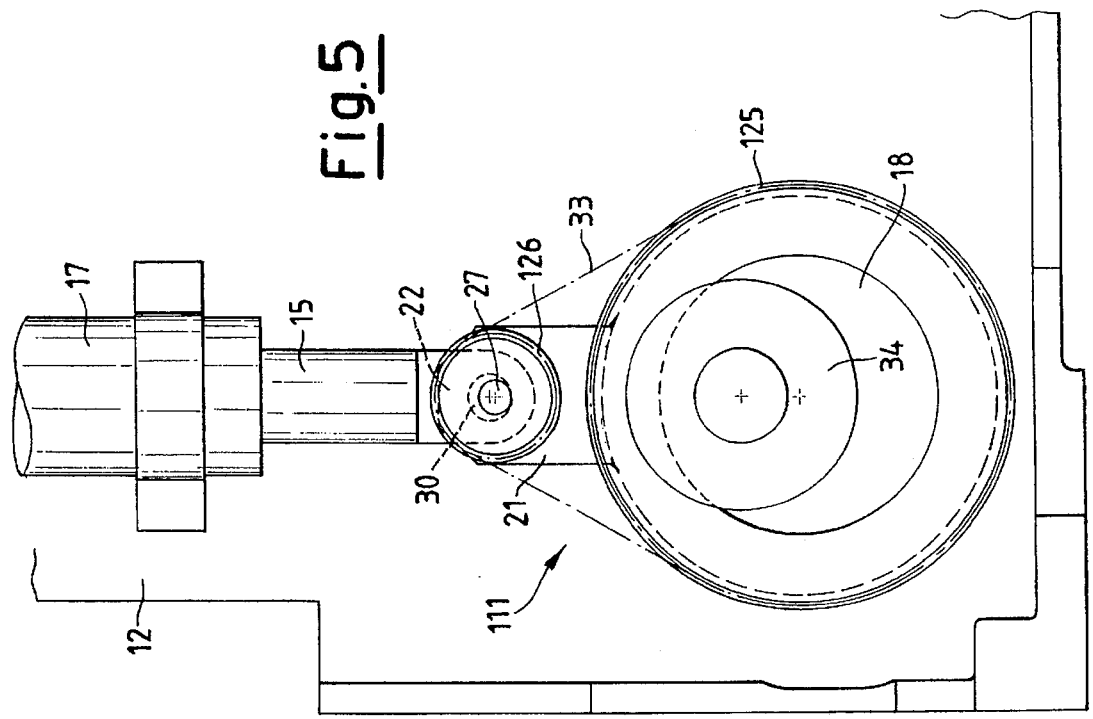
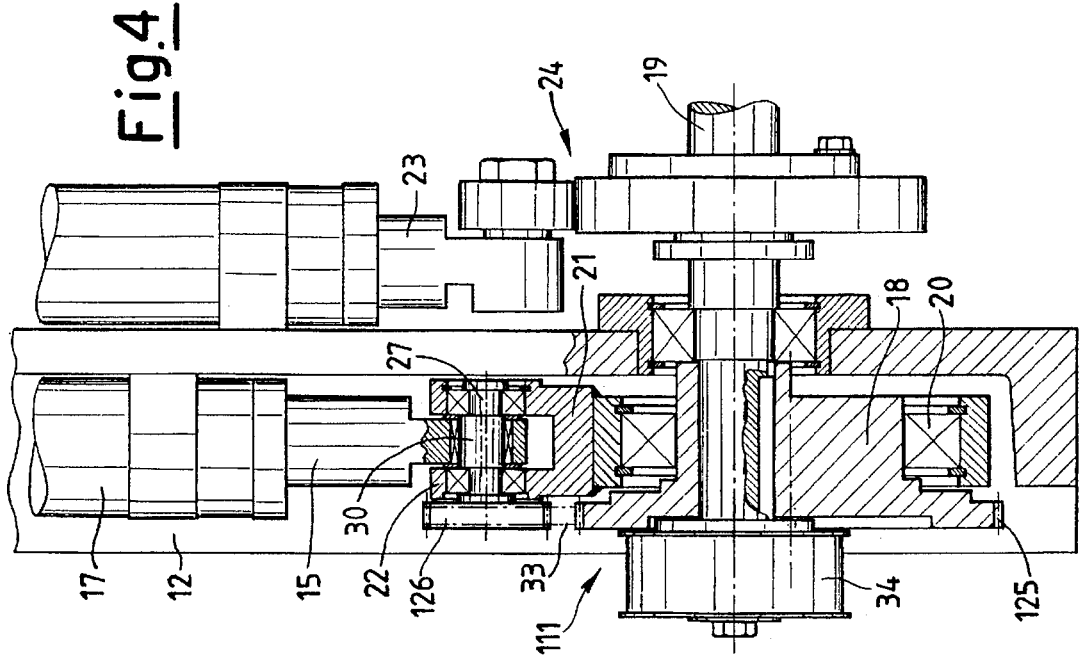

IMPROVED-EFFICIENCY WELDING DEVICE IN A PLASTIC BAG PRODUCTION MACHINE

BACKGROUND OF THE INVENTION

This invention relates to an improved-efficiency welding device in a plastic bag production machine.

In welding machines for plastic bag production in general, a plastics material in tubular form is passed in a flattened state between at least one pair of calenders within a transverse welding unit. This transverse welding unit comprises essentially a heated upper welding bar and a heated lower welding bar which are brought into contact with the plastics material passing between them. One welding bar, for example the upper one, moves reciprocatingly in a vertical direction towards and away from the other welding bar.

Because of the high rate at which the machine usually operates, the upper welding bar strikes the plastics material and the lower welding bar with considerable impact, to the extent of even cutting or at least marking the material, with consequent deterioration or the plastics material. In addition, the high rate means that an optimum weld cannot be achieved because of the extremely short time for which the hot bar remains on the plastics material.

SUMMARY OF THE INVENTION

An object of the present invention is to provide a welding device, in a plastic bag production machine, of generally improved efficiency, in the sense that it produces a good weld without scoring and hence deteriorating the plastics material.

A further object is, where possible, to reduce the temperature of the welding bar for an equal final state of the welded product, so as to operate at a lower temperature and hence avoid problems of softening and stickiness of the material, with possible soiling of the entire welding device.

These objects are attained according to the present invention by an improved-efficiency welding device in a plastic bag production machine, of the type comprising an upper welding bar and a lower welding bar, at least one of the upper and lower welding bars being driven with reciprocating vertical movement between a position separated from the plastics material to be welded and a position in contact with the plastics material and the lower or upper other bar, the movement of the at least one welding bar being imparted by a pair of vertically guided rods located at opposite ends of a support for the welding bar, and driven by a first eccentric linkage to which they are connected by a pin, the first linkage obtaining its movement from a central shaft, characterised in that a second eccentric is provided between the rod and the first eccentric linkage and driven by an additional motion transmission system which rotates it to cause the at least one welding bar to undergo a further lowering and/or raising movement at a predetermined stage, with resultant welding engagement between the at least one welding bar and said other welding bar.

BRIEF DESCRIPTION OF THE DRAWING

The characteristics and advantages of an improved-efficiency welding device in a plastic bag production machine according to the present invention will be more apparent from the description thereof given hereinafter by way of non-limiting example with reference to the accompanying schematic drawings, in which:

FIG. 3 is a side view of the device of FIG. 1; and

FIGS. 4 and 5 are views similar to those of FIGS. 2 and 3 showing a further embodiment of the device according to the present invention.

DETAILED DESCRIPTION

The drawings show an improved-efficiency welding device as applied to a plastic bag production machine and indicated overall by The bags, not shown, are produced in known manner by making, for example, successive spaced-apart transverse welds on continuous tubular plastics material passing through a welding device. In this respect, shoulders 12, only one of which is shown, of a bag production machine support a welding device comprising an upper welding bar 13 and a lower welding bar 14. The two bars 13 and 14 are, for example, suitably heated and are brought into contact with said plastics material, not shown, which passes between them.

Figure 1:
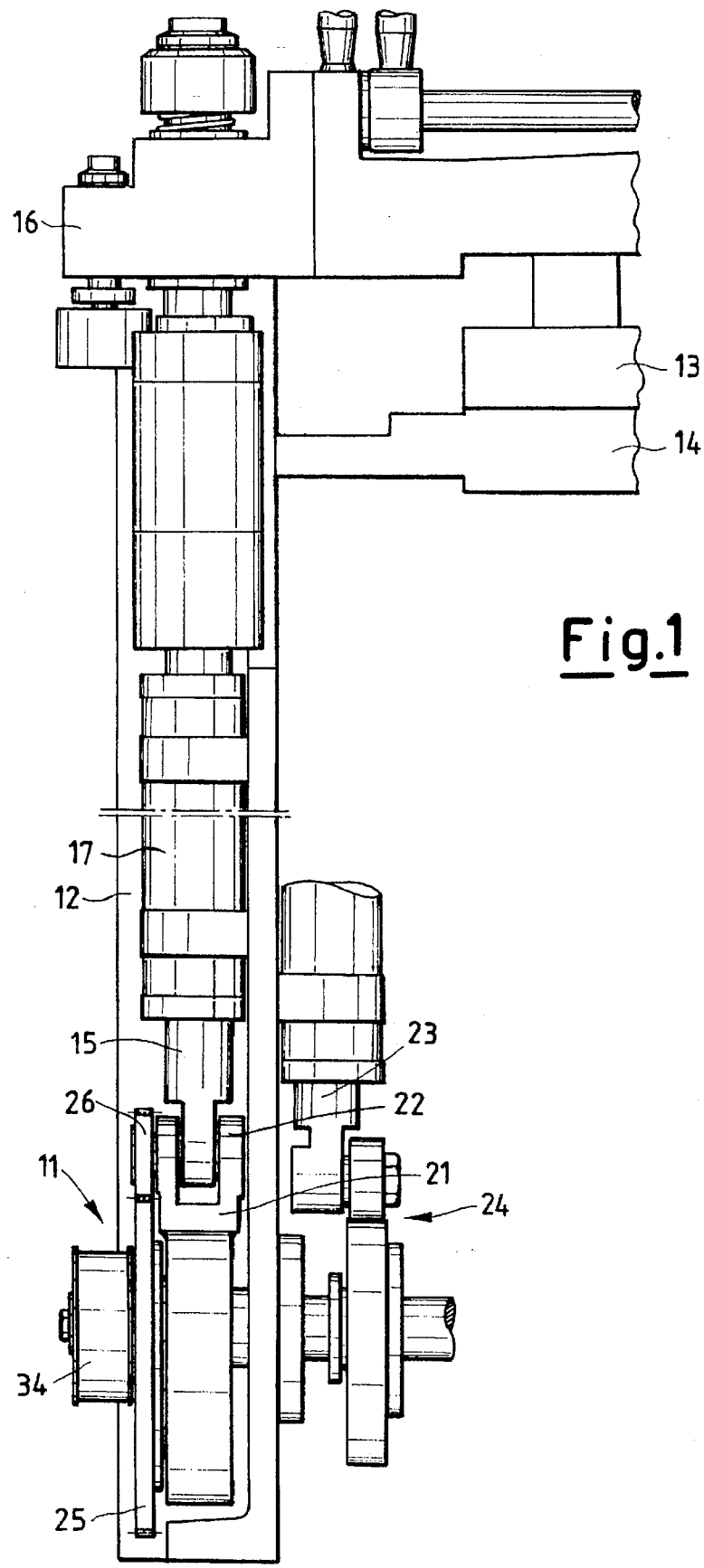
FIG. 1 is an elevational view of one shoulder of a bag production machine provided with a welding device according to the present invention.

FIG. 1 shows how the movement of the upper welding bar 13 is imparted by a pair of rods 15, only one of which is shown, which are located at opposite ends of a support 46 for the upper welding bar 13.

The rods 15 move with reciprocating motion, guided vertically by sleeves 17 rigid with the shoulders 12, towards and/or away from the lower other welding bar 14. The movement is imparted by an eccentric linkage, which comprises an inner eccentric 18 pivoted on the rod 45 and keyed onto a rotary shaft 19. Externally, the inner eccentric 18 supports, by way of a bearing 20, an outer further eccentric 21 extending forkwise as two lugs 22 which embrace on opposite sides the lower end of the rod 15, this being pivoted to them. The lower welding bar 14 could also be driven with reciprocating movement, by a further pair of rods, one of which is partially shown at 23. These second rods 23, which are connected to the lower welding bar 14, can obtain their reciprocating movement from a cam system, indicated overall by 24 and also connected to the rotary shaft 19.

According to the present invention on the shaft 19, in correspondence with the inner eccentric 18 of the linkage, there is positioned a first gear 25 which engages a second gear 26 keyed onto the pivot constraining the outer eccentric 21 to the rod 15. This pivot is in the form of a pin 27 located in holes 28 in the lugs 22 via respective bearings 29. The pin 27 has a central eccentric body 30 on which the end of the operating rod 45, holed at 32, is mounted by way of a further bearing 31. The second gear 26 is hence keyed onto an outward extension of the pin 27, while the first gear 25 is rigidly fixed to the inner eccentric 18 of the linkage, for example locked securely thereto by screws, not shown, or possibly formed directly in one piece with it. An additional motion transmission system is hence formed transmitting rotational movement between the drive shaft 19 and the pin 27 connected to the rod 15, to cause the upper welding bar 13 to undergo an additional reciprocating travel stroke.

During the rotation of the drive shaft 19, with raising and lowering of the outer eccentric 21 of the linkage, there is consequent raising and lowering of the connected rod 15. Hence, the tubular plastics material passing between the two welding bars 13 and 14 are either welded or not welded.

During this reciprocating movement, there is also a further movement determined by the presence of the additional motion transmission system, i.e. the two gears 25 and 26 in the illustrated example, which engage each other. In this respect, the first gear 25, rotated by the shaft 19, causes the second gear 26 to rotate with consequent rotation of the pin 27 on which it is keyed.

As stated, the pin 27 has a central eccentric body 30 on which the holed end 32 of the operating rod 15 is directly pivoted.

This arrangement comprising a second eccentric 30 determines a positive or negative additional travel stroke of the rod 15 for the upper welding bar 13, with respect to that imparted by the first eccentric linkage 18, 21. This additional stroke operates at a predetermined stage in the welding engagement between the upper welding bar 13, lower welding bar 14 and the plastics material.

The tooth ratio of the two gears 25 and 26 is calculated such that this additional stroke occurs several times during a complete welding cycle. In the example, the first gear 25 is of large diameter whereas the second gear 26 is of small diameter. In particular, the action of the second eccentric has to be able to develop when the upper welding bar 13 during its downward movement has almost arrived in proximity to the lower welding bar 14 with the first inner eccentric 18 almost in its maximum lowering position. In contrast, the pin 27, which rotates in the opposite direction to the shaft 19, begins to move the second inner eccentric 30 towards its maximum raising position. In this manner the upward movement of the second inner eccentric 30 is subtracted from the downward movement determined by the rotation of the first inner eccentric 18.

The correlation between the two eccentrics determines a slower approach of the upper welding bar 13 to the lower welding bar plus a short period of maintained contact between the two welding bars such as to improve the welding of the tubular plastics material.

Figure 2:
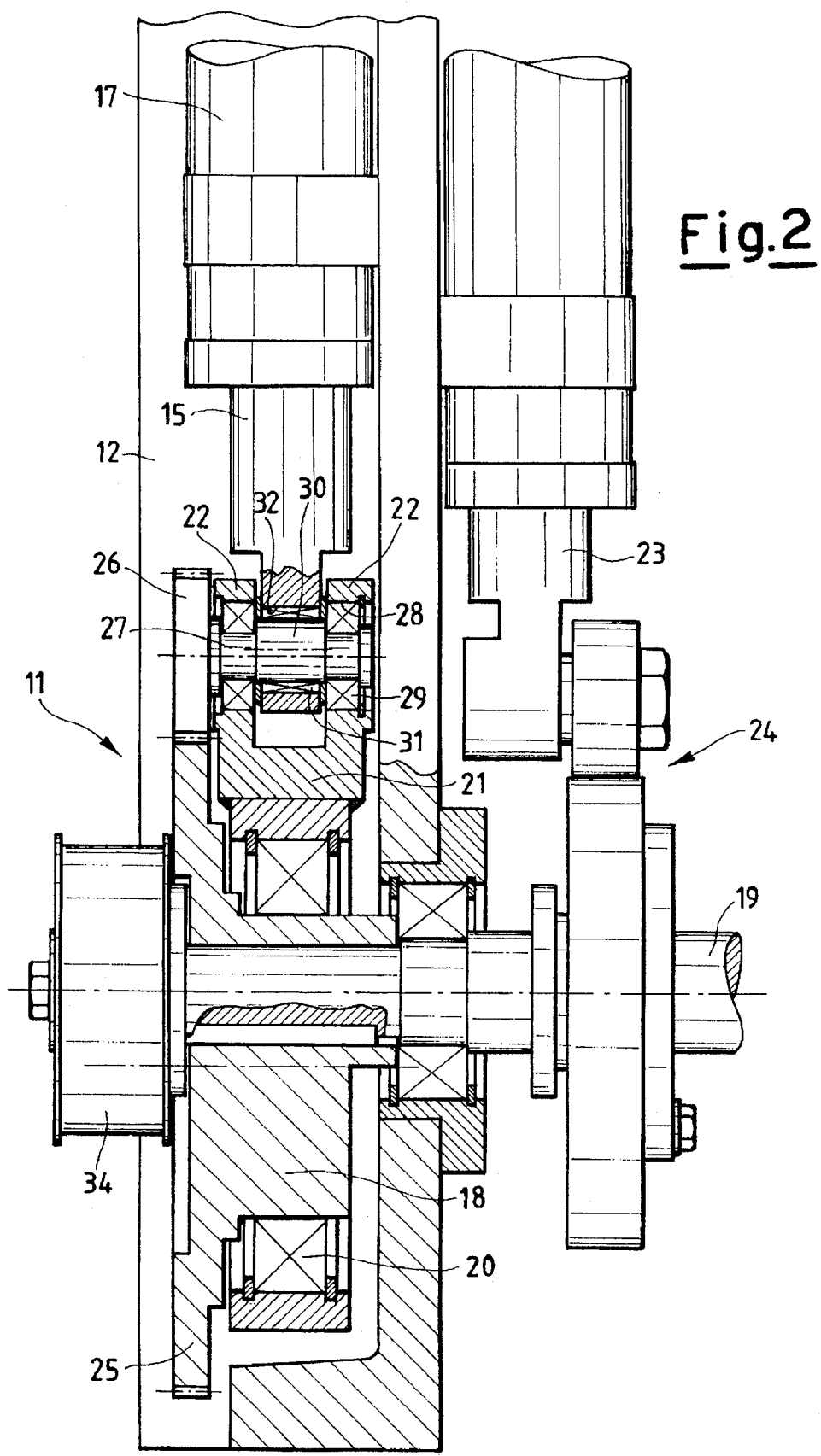
FIG. 2 is a partly sectional enlarged view of the connection portion of the vertical operating rod for the upper welding bar.

The additional motion transmission system transmitting the rotational movement between the drive shaft 19 and the pin 27 connected to the rod 15 can be of different form from that shown in FIGS. 1–3 by way of example.

In this respect, FIGS. 4 and 5 show a second example of an additional motion transmission system Ill determining an additional reciprocating stroke of the upper welding bar 13.

Equal elements are indicated by equal reference numerals in this further example, while elements of equal function are preceded by the number "1 "

A front toothed wheel 125 is rigidly connected to the inner eccentric 18 and a second toothed wheel 126 is keyed onto the pin 27 carrying the second inner eccentric 30. A toothed belt 33 extends between the two gears to provide the intermediate motion transmission system.

The teeth and ratios of the two toothed wheels and the teeth and length of the toothed transmission belt have to be suitably calculated. The operation is in any event the same, and such as to avoid sharp impact between the upper and lower welding bars and to provide a short period of maintained contact during welding.

Toothed wheels suitable for a chain drive with relative tensioning elements could instead be provided, which latter could also be provided in the case of the toothed belt.

As shown in both the illustrated embodiments, it is possible for the shaft 19 to extend further in order to accommodate a further toothed pulley 34 for driving a further section of the plastic bag production machine.

The described arrangement therefore increases the time for which the plastics material to be welded remains between the two welding bars of the bag production machine.

In addition it might be possible to reduce the welding temperature in the light of the aforesaid, so minimizing the danger of soiling of the welding bars because of material softening.

I claim:

1. An improved-efficiency welding device in a plastic bag production machine of the type which includes an upper welding bar and a lower welding bar, at least one of which is mounted to be cyclically driven with reciprocating vertical movement alternatingly between an open position in which at least one of the jaws is spaced apart from a flattened tube of plastics material which is being run through the machine for provision of a succession of longitudinally spaced, transversely extending welds of the plastics material, and a closed position in which the jaws engage the flattened tube respectively from above and below, for creating each of said welds, said device comprising:

a support for said one welding bar, said support having two ends spaced transversally of the machine;

a pair of vertically guided rods located at opposite ends of said support, for imparting reciprocating vertical movement to said support and therefore to said one welding bar;

two first eccentric linkages each connected by a respective pin so as to be in driving relation to a respective said vertically guided rod;

a central rotary shaft maintained, via respective intermediate structure in driving relation to said first eccentric linkages;

each said intermediate structure including a second eccentric linkage provided between a respective said pin and a respective said first eccentric linkage;

two respective additional motion transmission systems respectively disposed in driving relation to said second eccentric linkages, for causing said one welding bar to undergo at least one of further lowering and further raising movement at a respective predetermined state in said reciprocating vertical movement than would occur were said pins directly connected with said first eccentric linkages;

said second eccentrics being rigid with respective ones of said pins, on an axially central portion of each said pin;

a hole provided in each said rod at a lower end of said rod;

said axially central portion of each said pin being disposed in the respective said hole and mounted therein relative to the respective said rod, by a respective bearing;

each said first eccentric linkage including a respective outer eccentric;

a respective fork extending from each said outer eccentric;

each said fork having two lugs which embrace between them said lower end of the respective said rod; and each lug having holes provided with respective bearings which support respective ones of said pins at opposite ends of said pins.

2. The device of claim 1, wherein:

said one welding bar is said upper welding bar.

3. The device of claim 1, wherein said intermediate structure further includes:

respective first gears fixed rigidly on said shaft for rotation therewith; and respective said gears keyed onto respective of said pins and disposed in meshing engagement with respective of said first gears.

4. The device of claim 3, wherein:

said first gears each have a first, larger diameter, and said second gears each have a second, smaller diameter.

5. The device of claim 1, wherein said intermediate structure further includes:

respective first gears fixed rigidly on said shaft for rotation therewith;

respective said gears keyed onto respective of said pins; and respective toothed belts effectively connecting respective first and second gears.

* * * * *